March 15, 1932. C. E. CARTER 1,849,134
DAIRY APPARATUS
Filed Sept. 11, 1928

Inventor
CHARLES E. CARTER
By Edgar M. Kitchin
his Attorney

Patented Mar. 15, 1932

1,849,134

UNITED STATES PATENT OFFICE

CHARLES E. CARTER, OF FORT WAYNE, INDIANA, ASSIGNOR TO STERLING MANUFACTURING COMPANY, OF FORT WAYNE, INDIANA, A CORPORATION OF DELAWARE

DAIRY APPARATUS

Application filed September 11, 1928. Serial No. 305,214.

This invention relates to improvements in receptacles of the type adapted especially for filtration of incoming liquid as such receptacles are being filled, whereby the receptacles are especially well adapted for use during the process of milking.

The primary oject in view is the obtaining and maintaining of maximum approach toward perfect sanitation, and, to this end, the invention includes the provision of means for a high degree of efficient filtration, the guarding against accidental entry of unfiltered milk, or like liquid, and the ready dismantling and assemblage of parts to facilitate sterilization.

A more detailed object is the retention of a fibrous filter in a manner to prevent escape of liquid into a receptacle about the margins of the filter or otherwise than through the body of the filter while providing for the ready release of such filter for quick and easy renewal thereof.

With these and further objects in view as will in part hereinafter become apparent and in part be stated, the invention comprises certain novel constructions, combinations, and arrangements of parts as subsequently specified and claimed.

In the accompanying drawings,—

Figure 1:
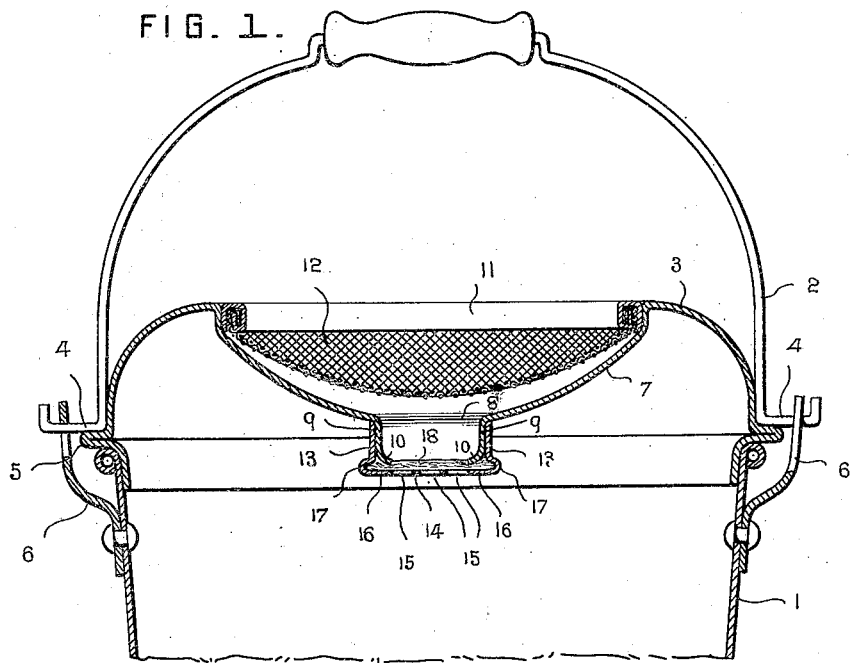
Figure 1 is a vertical, central section through a receptacle whose cover structure incorporates an embodiment of the present invention.
Figure 2:
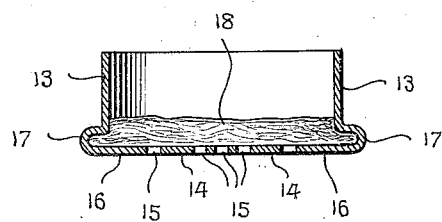
Figure 2 is a similar section of the filter fiber carrier detached.
Figure 3:
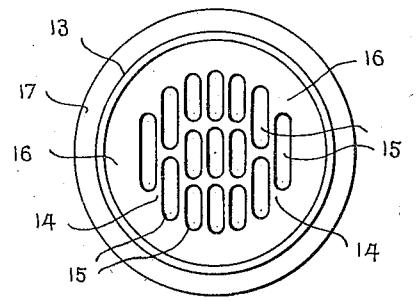
Figure 3 is a top plan view of the structure seen in Figure 2 with the fibrous material removed.

Referring to the drawings by numerals, 1 indicates a pail or other appropriate receptacle having the usual bail or other desired handle 2. The receptacle 1 is closed by a removable cover 3, which is preferably retained in its engagement with the receptacle 1 by the outstanding terminal portions 4, 4 of the bail 2, which engage an appropriate annular flange 5 outstanding from the cover 3 and also engage the ears 6 of receptacle 1.

The cover 3 is preferably formed with an upstanding parti-globular bulge about its peripheral portion, and arranged centrally of such bulge and pendent therefrom the cover is formed with a concavo-convex depending breast 7 terminating in an intake opening 8. The material of the walls of the breast 7 is preferably, during formation, drawn into the form of a pendent sleeve or tube 9 leading downward from the intake opening 8 and terminating in an inwardly turned annular flange 10 preferably slightly inclined to avoid any angle or lodging place for bacteria. The entire cover 3 with its parts 7 and 9 is preferably made of a single sheet of material formed to the contour shown in the drawings and above described.

Preferably relatively tightly fitting, but removably mounted within the upper portion or terminus of the breast 7, is a ring 11 carrying a filtering screen 12 concaved to extend down into the concavity of breast 7, but preferably spaced slightly above the same. The screen 12 serves merely to prevent entrance of the larger particles of solids.

The tubular projection 9, during operation, is frictionally engaged by a filter retainer or cap 13 consisting essentially of a sleeve adapted to telescope on the sleeve 9 and to sufficiently snugly fit thereon to frictionally resist removal and having a foraminous base 14. The apertures in the base 14 may assume any desired contour, but are preferably in the form of slots 15, and are arranged to leave an area 16 imperforate about the peripheral portion of the cap. The imperforate portion 16 corresponds to and lies immediately beneath the inturned flange 10 of sleeve 9. For convenience and facility in operating the cap 13, a lateral ledge or flange 17 is preferably provided, or other appropriate gripping means may be arranged to enable manual withdrawal of the cap 13 from sleeve 9 against the frictional engagement therewith.

Figure 4:
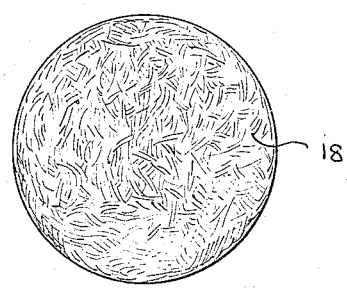
Figure 4 is a similar view of one of the fibrous filter pads detached.

The special function of the cap 13 is to provide a support and retainer for a filtering medium to be located in the opening surrounded by the flange 10. Such media may be cotton or linen fiber, or other fibrous material, or other appropriate and usable filtering media, and is preferably made up in the form of disc shaped pads, as best seen in Figure 4. Each pad 18 is of a size to snugly fit within the cap 13, so that the marginal portions of the pad will overlie the imperforate annular part 16 of the plate 14 and underlie the flange 10 so as to be clamped between these two parts when the cap 13 is pressed tightly upon the sleeve 9. Thus the margin of the fibrous material 18 is effectively guarded against the possibility of escape of liquid to and through the apertures 15 without passage through the filtering media 18.

While for the sake of simplicity and inexpensiveness, the frictional engagement of cap 13 with sleeve 9 is preferred and has been found to afford ample anchorage to avoid accidental dislodgment of the cap, any additional or other effective, easily detachable anchorage for the cap may be employed when desired so long as provision is made for the effective clamping or other guarding of the complete margin of the pad 18.

The operation will be readily understood from the foregoing, and consists simply of discharging the streams of milk, during the milking operation, into the screen 12, and thence into the funnel-like breast 7 from which it flows down onto the fibrous filter 18 and finds its way therethrough and through the apertures 15 to the body of the pail or other receptacle 1. Thus a maximum degree of sanitation is obtained in the maintenance of the milk free from objectionable bacteria or other matter in suspension, but it will be understood, of course, that the fibrous pads 18 will be of such thinness as to allow a reasonably rapid flow and enable the milk entering the funnel-shaped part 7 to discharge into the receptacle as rapidly as it enters.

An incidental advantage of the present improved structure possesses no small value and consists in protection against loss of milk if the receptacle 1 be overturned during a milking operation. It has heretofore been proposed in the event of such catastrophe to protect loss by the provision of a self-acting valve for closing the intake opening of the cover of milk pails. The present invention does not contemplate the use of such valve, but it will be obvious that the filter fiber 18 will resist an outflow of milk at any great speed or rapidity, and, therefore, in the event the receptacle is overturned, it can be restored to normal position with a loss of but a very small quantity of milk, such as may find its way through the filter material 18 during the time of displacement of the receptacle 1.

A further characterizing feature of the present invention is the fact that the advantages indicated are obtained by the use of an absolutely minimum number of parts constructed to afford greatest ease and maximum speed in accessibility, dismantling, and reassemblage. The operator, after a milking operation, merely grasps the cap 13, withdraws the same from tube 9, withdraws the pad 18, sterilizes the cover 3 and its parts, having removed the ring 11 and screen 12 for sterilizing purposes, and also sterilizes the cap 13. He then inserts a new pad 18 which is preferably, for commercial purposes, supplied in quantities in already prepared condition. When this has been accomplished, the screen 12 is replaced and cap 13 applied, and then the cover 3 may be restored to the receptacle 1 (the receptacle itself having also been cleansed) and the parts are ready for a second or further use. It should be understood that the bail 2 is preferably of sufficiently resilient or spring material to have the parts 4 drawn inward to a cover retaining position, except when it is desired to remove the cover when the parts 4 are pressed outward by an expanding action on the bail, as by manually pulling the ends of the bail apart. Thereupon, the cover 3 may be readily withdrawn, and may be replaced by the reverse action.

It is preferable in the practicing of the present invention to form the entire cover of a single sheet of sheet material, and the form and contour of the several parts of said cover is such as to lend itself readily to the production of a continuously smooth surface over the entire area, so that no pockets or crevices or other small places are left for the accumulation of bacteria or the germination thereof, and the milk which finds its way into receptacle 1, owing to passage through the fibrous filter 18 and contacting only with thoroughly sterile parts, will be free from foreign solids of every kind.

It should be understood that the present invention is not expected to eliminate from the liquid, such as milk, the native bacteria therein, but it does serve to eliminate extraneous or foreign solids of finely divided character, such as commonly found floating in the atmosphere which serve as bacteria carriers. Thus objectionable bacteria are largely eliminated and their opportunity to propagate avoided.

What I claim is:

In dairy apparatus, the combination of an intake sleeve terminating at its inward extremity in a converging flange, and a cap for the sleeve adapted to surround the sleeve, the bottom portion of the cap being perforated and the margin of the bottom portion at the place of union with the sleeve-engaging portion of the cap being enlarged to provide an annular space adapted to communicate with the space left by the convergence of said flange, whereby fibrous filtering media is adapted to be clamped between the cap and sleeve with a portion of the fibrous material filling said annular space and occupying the area outward of the converging flange.

In testimony whereof I affix my signature.

CHARLES E. CARTER.